United States Patent
Hwang et al.

(10) Patent No.: US 10,154,182 B2
(45) Date of Patent: Dec. 11, 2018

(54) CAMERA MODULE INCLUDING MULTIPLE CAMERA LENSES, ELECTRONIC DEVICE HAVING THE SAME, AND METHOD FOR CONTROLLING OPERATION OF CAMERA MODULE

(71) Applicant: Samsung Electronics Co., Ltd, Gyeonggi-do (KR)

(72) Inventors: Youngjae Hwang, Gyeonggi-do (KR); Kwangseok Byon, Gyeonggi-do (KR); Jungsoo Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 15/344,476

(22) Filed: Nov. 4, 2016

(65) Prior Publication Data

US 2017/0134628 A1    May 11, 2017

(30) Foreign Application Priority Data

Nov. 5, 2015    (KR) ........................ 10-2015-0155163

(51) Int. Cl.
*H04N 5/225*    (2006.01)
*H04N 5/232*    (2006.01)
*G02B 7/08*    (2006.01)
*G03B 5/00*    (2006.01)
(Continued)

(52) U.S. Cl.
CPC ............ *H04N 5/2257* (2013.01); *G02B 7/08* (2013.01); *G03B 3/10* (2013.01); *G03B 5/00* (2013.01);
(Continued)

(58) Field of Classification Search
CPC .. H04N 5/2257; H04N 5/2258; H04N 5/2252; H04N 5/2328; H04N 5/23287;
(Continued)

(56) References Cited

U.S. PATENT DOCUMENTS 8,730,338 B2    5/2014  Tavi et al.
8,743,179 B2 *  6/2014  Ryu .................... H04N 13/0239
                                                        348/46
(Continued)

FOREIGN PATENT DOCUMENTS

KR    20120021083 A    3/2012
KR    20130024160 A    3/2013
KR    20130086727 A    8/2013

OTHER PUBLICATIONS

Foreign Communication From a Related Counterpart Application, European Application No. 16196574.4-1902, Extended European Search Report dated Feb. 2, 2017, 7 pages.

(Continued)

*Primary Examiner* — Jason A Flohre

(57) ABSTRACT

Various embodiments of the present disclosure relate to a camera module including a plurality of lenses and an electronic device including the same. The camera module include: a plurality of lens barrels; a plurality of focusing modules in which the lens barrels are mounted; a driving member coupled with the focusing modules and having a recess; a fixing member in which the driving member coupled with the focusing modules is mounted, the fixing member having a recess formed in the center of the internal bottom surface thereof; the ball bearing received in the recesses of the driving member and the fixing member; and a circuit board formed to surround side surfaces of the fixing member and includes one or more driving coils corresponding to the one or more magnets. The driving member integrally drive the focusing modules in response to driving forces generated through the driving coils.

20 Claims, 16 Drawing Sheets

(51) Int. Cl.
  *G03B 3/10* (2006.01)
  *H04N 13/239* (2018.01)
(52) U.S. Cl.
  CPC ......... *H04N 5/2252* (2013.01); *H04N 5/2253* (2013.01); *H04N 5/2254* (2013.01); *H04N 5/2258* (2013.01); *H04N 5/2328* (2013.01); *H04N 5/23287* (2013.01); *G03B 2205/0007* (2013.01); *G03B 2205/0069* (2013.01); *H04N 5/23258* (2013.01); *H04N 13/239* (2018.05); *H04N 2213/001* (2013.01)
(58) Field of Classification Search
  CPC ............... H04N 5/2254; H04N 5/2253; H04N 2213/001; H04N 5/23258; H04N 13/0239; G03B 5/00; G03B 3/10; G03B 2205/0007; G03B 2205/0069; G02B 7/08
  See application file for complete search history.

(56) References Cited

U.S. PATENT DOCUMENTS

| | | | |
|---|---|---|---|
| 9,438,801 B2 | 9/2016 | Hwang et al. | |
| 9,531,954 B2* | 12/2016 | Dong | H04N 5/23287 |
| 2011/0169920 A1 | 7/2011 | Ryu et al. | |
| 2013/0044382 A1 | 2/2013 | Phoon et al. | |
| 2013/0141541 A1* | 6/2013 | Jung | H04N 5/225 348/46 |
| 2014/0009631 A1 | 1/2014 | Topliss | |
| 2014/0132738 A1 | 5/2014 | Ogura et al. | |
| 2015/0070781 A1* | 3/2015 | Cheng | G02B 13/009 359/696 |
| 2015/0201128 A1 | 7/2015 | Dong | |
| 2015/0296112 A1 | 10/2015 | Park et al. | |
| 2015/0316745 A1* | 11/2015 | Chen | H02K 41/035 359/824 |
| 2016/0301874 A1* | 10/2016 | Hyun | H04N 5/23287 |
| 2017/0094187 A1* | 3/2017 | Sharma | H04N 5/2258 |
| 2017/0353645 A1* | 12/2017 | Shabtay | H04N 5/2258 |
| 2018/0031860 A1* | 2/2018 | Bachar | G02B 27/646 |
| 2018/0048799 A1* | 2/2018 | Bachar | H04N 5/2258 |

OTHER PUBLICATIONS

Foreign Communication From a Related Counterpart Application, PCT Application No. PCT/KR2016/012284, International Search Report dated Feb. 6, 2017, 3 pages.

* cited by examiner

CAMERA MODULE INCLUDING MULTIPLE CAMERA LENSES, ELECTRONIC DEVICE HAVING THE SAME, AND METHOD FOR CONTROLLING OPERATION OF CAMERA MODULE

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2015-0155163, filed on Nov. 5, 2015, which is hereby incorporated by reference for all purposes as if fully set forth herein.

TECHNICAL FIELD

Various embodiments of the present disclosure relate to a camera module that includes multiple camera lenses, an electronic device having the same, and a method of controlling the operation of the camera module.

BACKGROUND

With the remarkable development of information and communication technologies and semiconductor technologies, electronic devices are being increasingly and widely used. Furthermore, recent electronic devices are combined with various terminals without being limited to their traditional unique areas. For example, mobile communication terminals complexly provide a variety of functions, such as a function of watching TV and listening to radio broadcasts, a function of reproducing various multimedia (images, music, etc.), a function of accessing the Internet, a memo function, and the like, as well as general communication functions, such as a voice call function, a function of sending and receiving messages, and the like.

In particular, recent electronic devices provide a camera function of photographing a subject and creating and storing an image or video. In recent years, consumers' demands for acquiring high-quality still and/or moving images have increased. Accordingly, the recent electronic devices are usually equipped with high-resolution camera modules.

The camera modules increase in size in order to provide high performance as described above. However, the recent electronic devices have become slimmer. Due to this, there is a difficulty in applying the high-performance camera modules to the slim electronic devices. Furthermore, in order to provide high-quality images or videos, technologies are increasingly required that efficiently provide an auto-focusing (AF) function of automatically setting a focus and an optical image stabilizer (OIS) function for preventing the definition of an image from being degraded by a shaking movement of a user's hand.

SUMMARY

To address the above-discussed deficiencies, it is a primary object to provide a camera module and an electronic device that includes the same, in which the camera module includes a plurality of lenses to photograph a high-quality image or video and is capable of being applied to a slim electronic device.

Various embodiments of the present disclosure provide a camera module capable of independently providing an auto-focusing (AF) function and an optical image stabilizer (OIS) function and an electronic device that includes the same.

Various embodiments of the present disclosure provide a camera module and an electronic device that includes the same, in which the camera module more accurately and efficiently provides an OIS function by controlling the inclination of the camera module (e.g., a lens or a focusing module).

A camera module, according to various embodiments of the present disclosure, may include: a plurality of lens barrels that include a plurality of lenses, respectively; a plurality of focusing modules in which the plurality of lens barrels are mounted, respectively, wherein each focusing module includes one or more magnets on side surfaces thereof; a driving member coupled with the plurality of focusing modules and having a recess formed to receive a part of a ball bearing; a fixing member in which the driving member coupled with the plurality of focusing modules is mounted, the fixing member having a recess formed in a center of an internal bottom surface thereof and a part of the ball bearing is seated in the recess; the ball bearing received in the recess of the driving member and in the recess of the fixing member; and a circuit board formed to surround side surfaces of the fixing member and includes one or more driving coils corresponding to the one or more magnets. The driving member may integrally drive the plurality of focusing modules in response to driving forces generated through the one or more driving coils.

An electronic device, according to various embodiments of the present disclosure, may include the camera module. A method of controlling the operation of the camera module, according to various embodiments of the present disclosure, may include: detecting a signal output from a sensor according to a movement of a driving member and a plurality of focusing modules in the camera module; and changing amounts or directions of currents applied to one or more driving coils such that the signal output from the sensor has a preset value.

The camera module and the electronic device that includes the same, according to various embodiments of the present disclosure, can accurately and efficiently provide an OIS function by controlling the inclination of the camera module (e.g., the lenses or the focusing modules).

The camera module and the electronic device that includes the same, according to various embodiments of the present disclosure, can provide an OIS function that has a wider correction range, compared with an OIS function in a lens shift method.

The camera module and the electronic device that includes the same, according to various embodiments of the present disclosure, have a structure in which independent focusing modules (lenses) are combined with each other, which makes it possible to easily replace and repair a damaged focusing module.

The camera module and the electronic device that includes the same, according to various embodiments of the present disclosure, can independently provide an AF function and an OIS function.

The camera module and the electronic device that includes the same, according to various embodiments of the present disclosure, can provide a more accurate OIS function by controlling the camera module directly using a signal that is obtained by detecting the motion of the rotating lenses or focusing modules.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
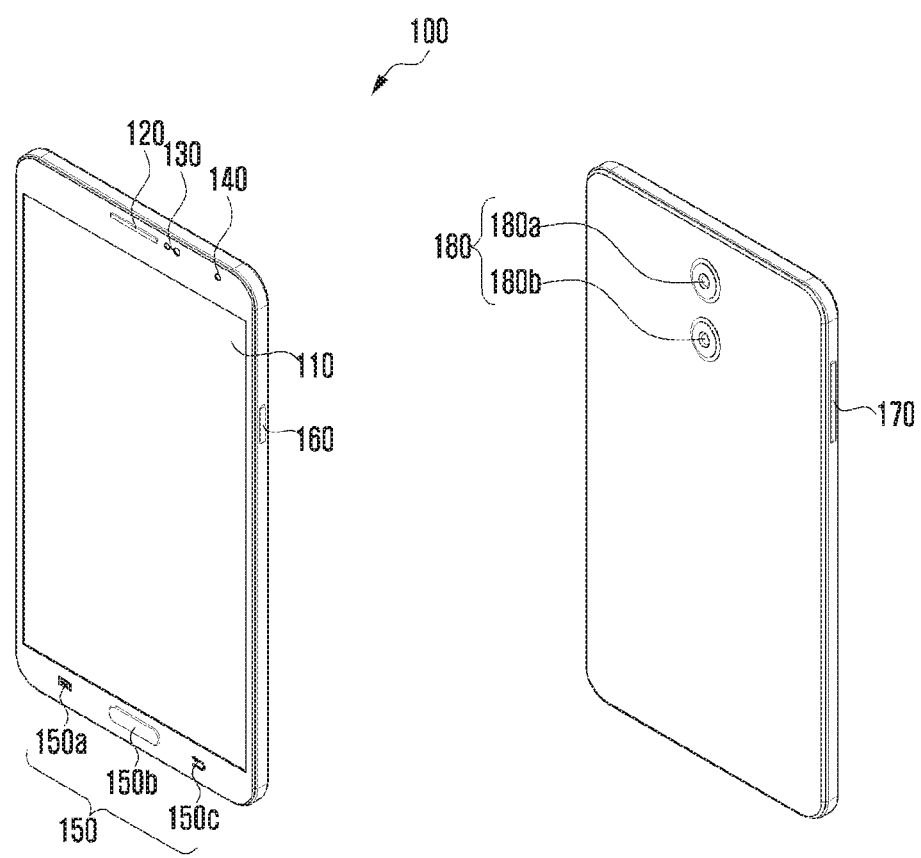
FIG. 1 illustrates an electronic device according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. As used herein, singular forms may include plural forms as well unless the context clearly indicates otherwise. As used herein, singular forms may include plural forms as well unless the context clearly indicates otherwise. The expression "a first," "a second," "the first," or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for," "having the capacity to," "designed to," "adapted to," "made to," or "capable of" in terms of hardware or software, according to circumstances. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., SAMSUNG HOMESYNC™, APPLE TV™, or GOOGLE TV™), a game console (e.g., XBOX™ and PLAYSTATION™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to certain embodiments of the present disclosure is not limited to the above described devices. In the present disclosure, the term "user" may indicate a person using an electronic device or a device (e.g., an artificial intelligence electronic device) using an electronic device.

Hereinafter, for the convenience of description, a portable terminal (e.g., a smart phone) will be described as an example of an electronic device according to various embodiments of the present disclosure. Furthermore, it will be exemplified that the electronic device includes a camera module that includes a dual lens. However, various embodiments of the present disclosure are not limited thereto.

FIG. 1 is a view illustrating the front and rear of an electronic device according to various embodiments of the present disclosure.

Referring to FIG. 1, the electronic device 100, according to the various embodiments of the present disclosure, may include: a display unit 110 on the front thereof a speaker (e.g., a receiver) 120, an illuminance sensor 130, and a front camera 140 on the upper side of the display unit 110; and a plurality of keys 150 on the lower side of the display unit 110. For example, the plurality of keys 150 may include a menu key 150a, a home key 150b, and a cancel key 150c.

The electronic device 100 may include a power key 160 and a volume key 170 on the lateral side surface thereof. Furthermore, the electronic device 100 may include a rear camera 180 on the rear (or back) thereof. For example, at least a part of the rear camera 180 may be mounted in the housing of the electronic device 100. The rear camera 180 may include dual lenses 180a and 180b.

The rear camera 180, according to certain embodiments of the present disclosure, may provide an auto-focusing (hereinafter, referred to as AF) function and an optical image stabilizer (hereinafter, referred to as OIS) function. For example, the electronic device 100 may separately control AF functions for the multiple lenses 180a and 180b (Discrete Control). Furthermore, the electronic device 100 may integrally (simultaneously) control OIS functions for the multiple lenses 180a and 180b (Integrated Control). The multiple lenses may separately move in the direction of the optical axis and may integrally (simultaneously) move in at least one of the first and second directions that are perpendicular to the optical axis.

The electronic device 100 illustrated in FIG. 1 is only an illustration and does not limit embodiments of the present disclosure. Although the electronic device 100 is illustrated as, for example, a bar-type electronic device in FIG. 1, the electronic device 100 may be of a folder type, a slide type, or a flexible type.

Furthermore, although the rear camera 180 of the electronic device 100 is illustrated as including two lenses in FIG. 1, the rear camera 180 of the electronic device 100 may include three or more lenses according to various embodiments of the present disclosure. Moreover, the front camera 140 of the electronic device 100 may also include multiple lenses.

In addition, although the electronic device 100 is illustrated as a portable terminal in FIG. 1, the electronic device 100, according to various embodiments of the present disclosure, may be all electronic devices that may include a camera module.

Figure 2:
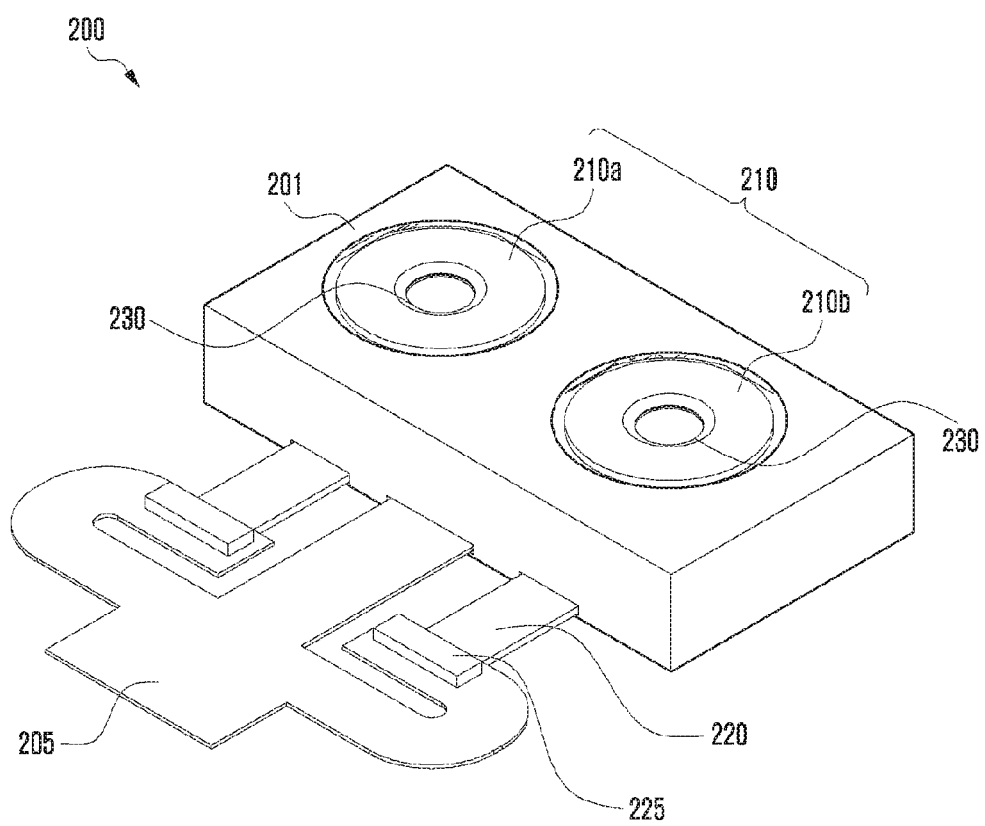
FIG. 2 illustrates a camera module according to various embodiments of the present disclosure.

FIG. 2 is a view illustrating a camera module according to various embodiments of the present disclosure.

The camera module 200, according to the various embodiments of the present disclosure, may include a camera module housing 201, a plurality of lens barrels 210a and 210b that include a plurality of lenses 230, respectively, and flexible circuit boards 220. According to certain embodiments, the camera module 200 may include: a plurality of focusing modules in which the plurality of lens barrels 210a and 210b are mounted; a driving member coupled with the plurality of focusing modules to integrally drive the plurality of focusing modules; a fixing member where the plurality of focusing modules and the driving member are coupled and mounted; and a ball bearing disposed between the driving member and the fixing member. For example, the housing of the camera module 200 may include elements that constitute the camera module 200, such as the focusing modules, the driving member, the ball bearing, the fixing member, and the like. For example, the camera module housing 201 may protect the elements of the camera module 200 included therein from an external shock and may prevent separation of the elements to the outside.

The flexible circuit boards 220 may be electrically connected to one or more components in the camera module housing 201. The flexible circuit boards 220 may extend from the camera module housing 201 to the outside. For example, the flexible circuit boards 220 may extend from the circuit boards of the plurality of focusing modules included in the camera module 200 to the outside through the camera module housing 201. The flexible circuit boards 220 may be flexible printed circuit boards.

The flexible circuit boards 220 may be connected to connectors 225 of a connecting member 205. For example, the flexible circuit boards 220 may include connectors. The connectors of the flexible circuit boards 220 may be connected with the connectors 225 of the connecting member 205 that correspond thereto.

The connecting member 205 may extend from the camera module 200 and may be connected to the main circuit board of an electronic device (e.g., a portable terminal, etc.). According to certain embodiments, the connecting member 205 may be a circuit board electrically connected with the camera module 200, or may include at least a part of a circuit board electrically connected with the camera module 200.

Figure 3:
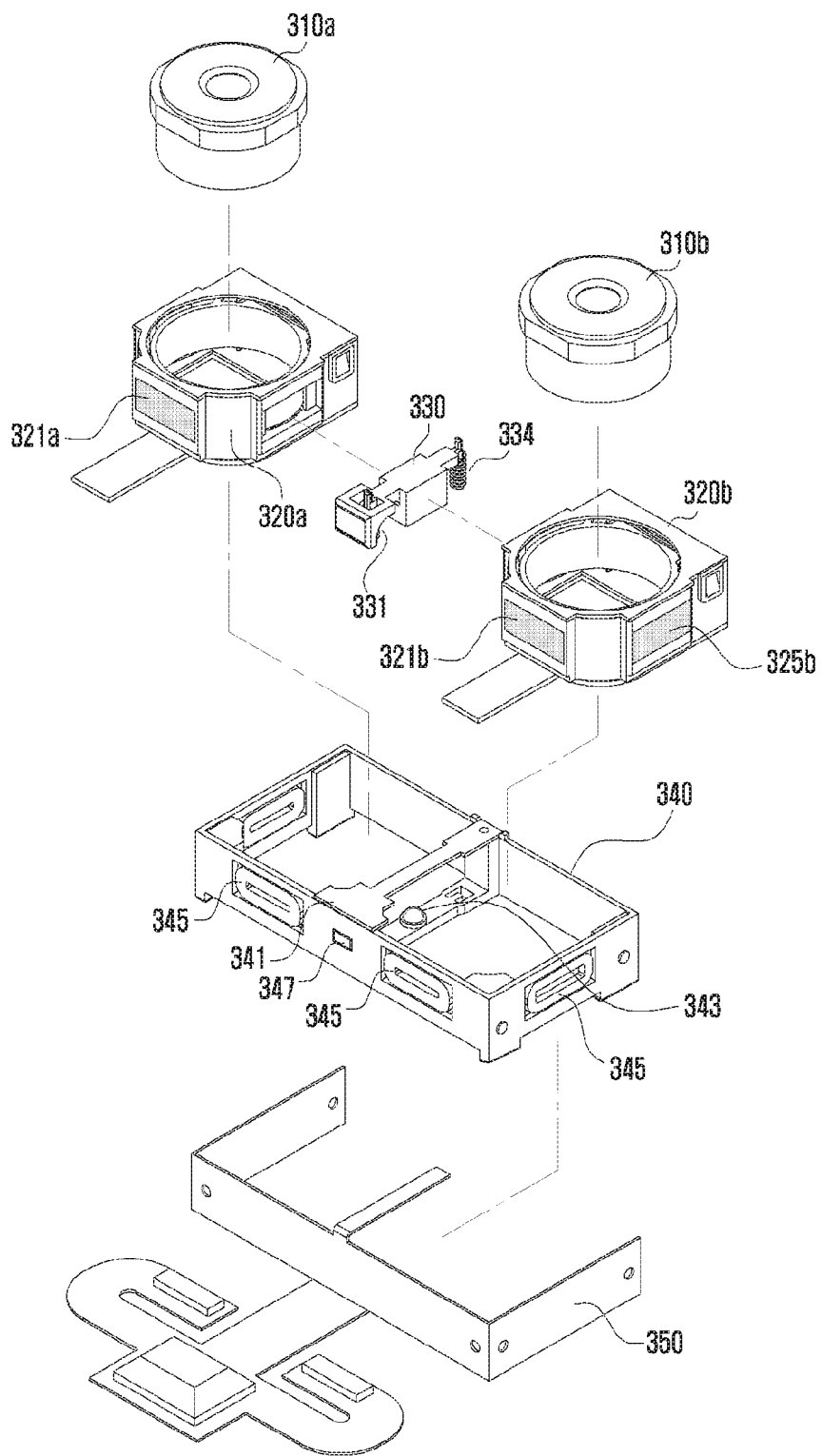
FIG. 3 illustrates a camera module according to various embodiments of the present disclosure.

FIG. 3 is an exploded perspective view of a camera module according to various embodiments of the present disclosure.

According to certain embodiments of the present disclosure, the camera module may include a plurality of lens barrels 310a and 310b, a plurality of focusing modules 320a and 320b, a driving member 330, a fixing member 340, and a circuit board 350. The following description will be given under the assumption that there are two lens barrels and two focusing modules (i.e., a dual lens camera module). However, various embodiments of the present disclosure are not limited thereto.

The plurality of lens barrels 310a and 310b may include lenses, respectively. The plurality of lens barrels 310a and 310b may be mounted in the plurality of focusing modules 320a and 320b, respectively. For example, the first lens barrel 310a may be mounted in the first focusing module 320a, and the second lens barrel 310b may be mounted in the second focusing module 320b.

According to embodiments, each of the focusing modules 320a and 320b may include one or more magnets on side surfaces thereof. For example, the first focusing module 320a may include a first magnet 321a on the front side surface thereof. For example, the first focusing module 320a may include a second magnet (not illustrated) on the side surface thereof that is opposite to its side surface to which the driving member 330 is connected. The second focusing module 320b may include a third magnet 321b on the front side surface thereof. The second focusing module 320b may include a fourth magnet 325b on the side surface thereof that is opposite to its side surface to which the driving member 330 is connected. The first to fourth magnets 321a, 321b, and 325b may generate driving forces for rotating the plurality of focusing modules 320a and 320b and the driving member 330 according to the currents flowing in driving coils 345.

According to certain embodiments, each of the focusing modules 320a and 320b may include a recess or slot formed in one side surface thereof to which the driving member 330 may be connected. For example, each of the focusing modules 320a and 320b may include an opening formed in one side surface thereof into which the driving member 330 may be inserted.

According to certain embodiments, the plurality of focusing modules 320a and 320b may be connected to the driving member 330. For example, the driving member 330 may be inserted into one side surface of each focusing module 320a, 320b. The driving member 330 may be fixedly coupled with the focusing modules 320a and 320b by means of an adhesive, a band, or mechanical coupling. The driving member 330 may integrally operate with the plurality of focusing modules 320a and 320b while being coupled with the focusing module 320a, 320b. According to certain embodiments, the driving member 330 may integrally drive the plurality of focusing modules 320a and 320b in response to the driving forces generated by the driving coils 345. For example, the driving member 330 and the plurality of focusing modules 320a and 320b may be integrally rotated about a ball bearing 343 in one direction by the driving forces that are generated by the first to fourth magnets 321a, 321b, and 325b and the driving coils 345. For example, the driving member 330 and the plurality of focusing modules 320a and 320b may integrally rotate forward and rearward about the ball bearing 343 by a specified angle. For example, the driving member 330 and the plurality of focusing modules 320a and 320b may integrally rotate leftward and rightward about the ball bearing 343 by a specified angle.

According to certain embodiments, the driving member 330 may include one or more springs 331 and 334 that are connected to the internal bottom surface of the fixing member 340 to prevent the driving member 330 from being separated from the fixing member 340. For example, the springs 331 and 334 may connect the driving member 330 and the fixing member 340. Although the driving member 330 is illustrated as including the two springs 331 and 334 in FIG. 3, the driving member 330 may include one spring, or may include three or more springs according to various embodiments.

According to certain embodiments, the driving member 330 has a recess formed in the rear surface thereof in which at least a part of the ball bearing 343 is received. For example, the driving member 330 may have a recess concavely formed in the central portion of the bottom surface thereof such that a part of the ball bearing 343 is received in the recess.

According to certain embodiments, the driving member 330 may include a protrusion that protrudes from one side surface thereof in one direction. The protrusion may include a magnet for measuring the tilt angle of the driving member 330.

According to certain embodiments, the plurality of focusing modules 320a and 320b and the driving member 330, which are coupled with each other, may be mounted in the fixing member 340. The fixing member 340 may include a plurality of openings corresponding to the positions in which the plurality of focusing modules 320a and 320b are mounted in order to enable the plurality of focusing modules 320a and 320b to rotate. The fixing member 340 has a recess formed in the center of the internal bottom surface thereof in which at least a part of the ball bearing 343 is seated. For example, the fixing member 340 may have a bottom surface in which the recess where the ball bearing 343 is seated is formed between the plurality of openings. The ball bearing 343 may be disposed between the driving member 330 and the fixing member 340. For example, the ball bearing 343 may be disposed in the spherical space that is formed by the recess in the rear surface of the driving member 330 and the recess in the internal bottom surface of the fixing member 340.

According to certain embodiments, the fixing member 340 may include one or more driving coils 345 that are disposed on side surfaces thereof to correspond to the one or more magnets included in the plurality of focusing modules 320a and 320b. For example, the fixing member 340 may include recesses (slots) or openings formed in the side surfaces thereof in which the one or more driving coils 345 may be mounted. The driving coils 345 may generate driving forces for rotating the plurality of focusing modules 320a and 320b and the driving member 330 together with the one or more magnets included in the plurality of focusing modules 320a and 320b according to the directions and amounts of currents flowing in the driving coils 345.

According to certain embodiments, the fixing member 340 may further include a cover 341 that covers the top of the driving member 330 mounted in the fixing member 340 in order to prevent the driving member 330 from being separated from the fixing member 340.

According to certain embodiments, the fixing member 340 may further include a sensor 347 that detects the tilted state of the driving member 330 and the plurality of focusing modules 320a and 320b by measuring the states of the one or more magnets (e.g., the first to fourth magnets) included in the plurality of focusing modules 320a and 320b.

According to certain embodiments, the circuit board 350 may be formed to surround side surfaces of the fixing member 340. For example, the circuit board 350 may be electrically connected with the driving coils 345 of the fixing member 340. The circuit board 350 may be electrically connected with the sensor 347 of the fixing member 340.

According to various embodiments of the present disclosure, the driving coils 345 and the sensor 347 may be mounted on the circuit board 350. For example, the driving coils 345 and the sensor 347 may not be mounted on the fixing member 340, but may be mounted on the circuit board 350. For example, the driving coils 345 and the sensor 347 may be configured to surround the outside of the fixing member 340 together with the circuit board 350 while being mounted on the circuit board 350.

According to certain embodiments, the circuit board 350 may be connected to the main circuit board of an electronic device that includes the camera module. The circuit board 350 may include connectors. The circuit board 350 may be connected with flexible circuit boards extending from the internal circuit boards of the plurality of focusing modules 320a and 320b through the connectors. According to certain embodiments, the circuit board 350 may be electrically connected with a power supply unit (e.g., a battery), a processor for controlling the operation of the camera module, or a memory. According to certain embodiments, the processor, the power supply unit, or the memory may be electrically connected in the form of a single module or chip to the circuit board 350.

Figure 4:
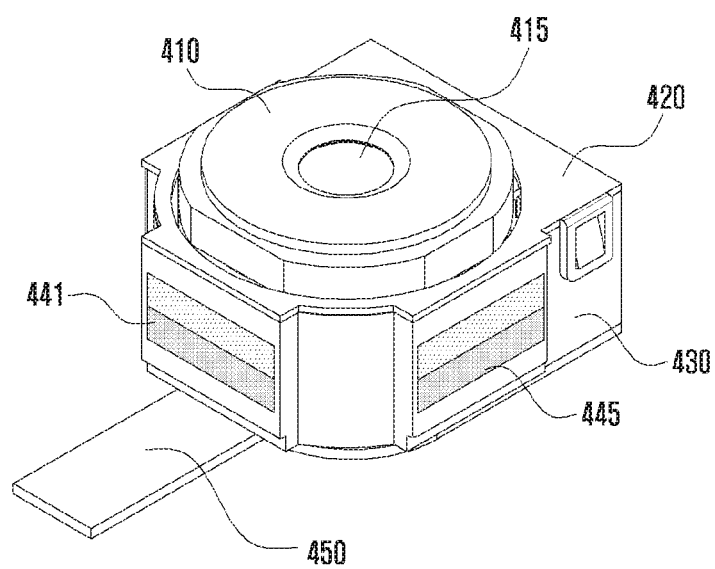
FIG. 4 illustrates a focusing module included in a camera module according to various embodiments of the present disclosure.

FIG. 4 is a view illustrating a focusing module included in a camera module according to various embodiments of the present disclosure.

According to certain embodiments, the focusing module may include a lens 415, a lens barrel 410 that includes the lens, a cover 420, a focusing module housing 430, a plurality of magnets 441 and 445, and a flexible circuit board 450.

The lens 415 may be mounted in the lens barrel 410. The lens barrel 410 may be mounted in the focusing module housing 430. The cover 420 may cover the top of the focusing module housing 430 while the lens barrel 410 is mounted in the focusing module housing 430. The cover 420 may include an opening through which at least a part of the lens barrel 410 protrudes to the outside. For example, the lens barrel 410 may protrude from the cover 420 to the outside. The lens barrel 410 may move in the direction of the optical axis. For example, the lens barrel 410 may move in the direction of the optical axis through the opening of the cover.

The cover 420 and the focusing module housing 430 may include connecting parts that correspond to each other. For example, the cover 420 and the focusing module housing 430 may include a recess and a protrusion, respectively, and vice versa. The cover 420 and the focusing module housing 430 may be coupled and secured to each other by fastening the protrusion to the recess. According to various embodiments, the cover 420 and the focusing module housing 430 may be coupled with each other through various well-known coupling methods.

The focusing module housing 430 may include one or more magnets. For example, the focusing module housing 430 may include the first magnet 441 disposed on the front side surface thereof and the second magnet 445 disposed on one lateral side surface thereof. The focusing module housing 430 may include a circuit board therein. For example, the circuit board may be electrically connected with elements (such as a coil, a motor, etc.) for operating the focusing module and the lens (lens barrel) that are included in the focusing module housing 430.

The flexible circuit board 450 may extend from the circuit board disposed within the focusing module housing 430 to the outside through the focusing module housing 430. The flexible circuit board 450 may be electrically connected to an external circuit board (e.g., a circuit board that surrounds the camera module, the main circuit board of an electronic device that includes the camera module, etc.).

Figure 5:
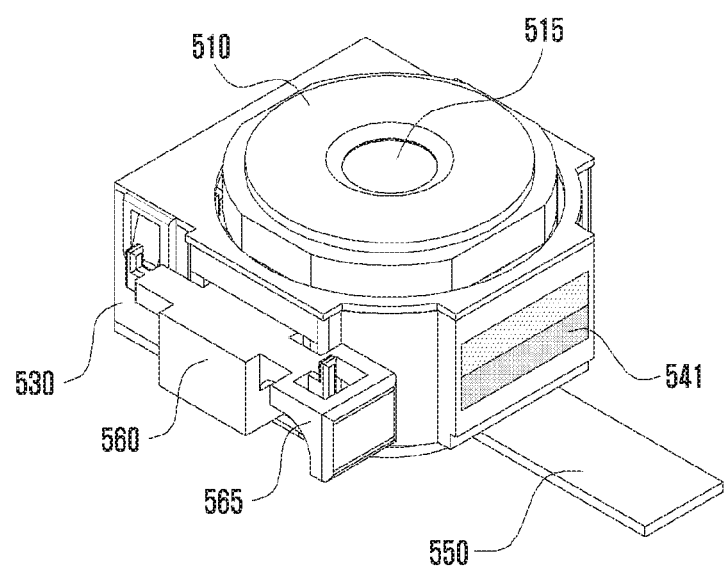
FIG. 5 illustrates a focusing module included in a camera module according to various embodiments of the present disclosure.

FIG. 5 is a view illustrating a focusing module included in a camera module according to various embodiments of the present disclosure. FIG. 5 illustrates an example of the focusing module illustrated in FIG. 4, which is viewed from the opposite side. Hereinafter, detailed descriptions of elements that are the same as those illustrated in FIG. 4 will be omitted.

According to certain embodiments, the focusing module may include a lens 515, a lens barrel 510 that includes the lens, a cover 520, a focusing module housing 530, a plurality of magnets 541 and 545, and a flexible circuit board 550.

According to certain embodiments, the focusing module housing 530 may be connected, at one side surface thereof, with a driving member 560. For example, the focusing module housing 530 may include an opening formed in the side surface thereof into which the driving member 560 may be inserted. The driving member 560 may be coupled to the opening in the side surface of the focusing module housing 530. According to various embodiments, the driving member 560 may be coupled and secured to the focusing module housing 530 using various well-known coupling or fastening methods.

According to certain embodiments, the focusing module housing 530 may include one or more magnets. For example, the focusing module housing 530 may include the first magnet 541 disposed on the front side surface thereof and the second magnet (not illustrated) disposed on one lateral side surface thereof. For example, the focusing module housing 530 may include the second magnet on the side surface thereof that is opposite to its side surface to which the driving member 560 is connected.

According to certain embodiments, the driving member 560 may include a protrusion 565 that protrudes from one side surface thereof in one direction and has a flat surface parallel to the first magnet 541 that is disposed on the front side surface of the focusing module housing 530. According to certain embodiments, the protrusion 565 may include a magnet (not illustrated) for measuring the tilt angle of the driving member 560.

Figure 6:
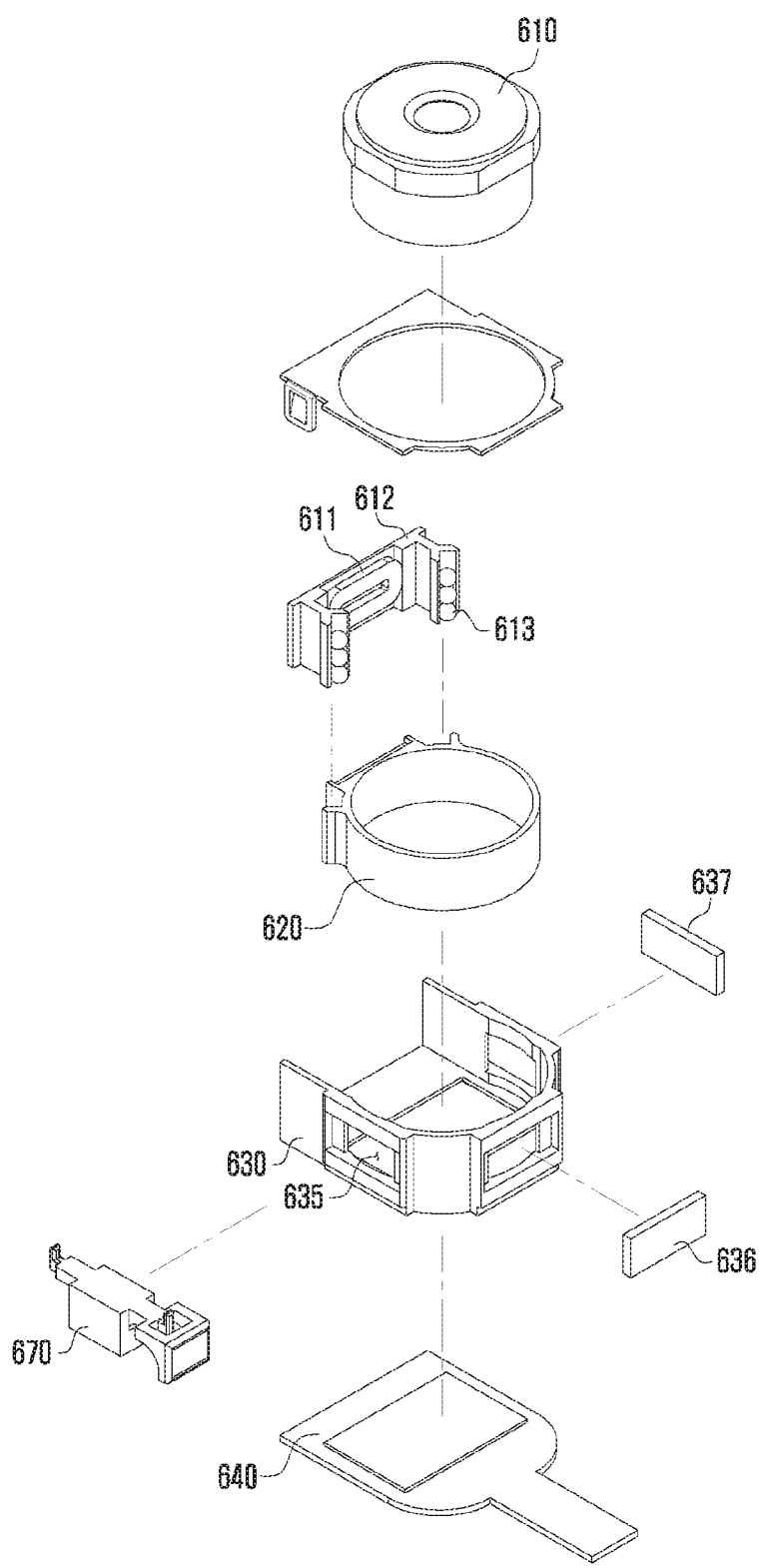
FIG. 6 illustrates a focusing module and a driving member that are included in a camera module according to various embodiments of the present disclosure.

FIG. 6 is an exploded perspective view illustrating a focusing module and a driving member that are included in a camera module according to various embodiments of the present disclosure.

According to certain embodiments, the focusing module may include a lens barrel 610, a stationary frame 612, a moving frame 620, a focusing module housing 630, a circuit board 640, and a cover.

The lens barrel 610 may include a lens. For example, the lens barrel 610 may have one lens mounted thereon. The lens barrel may include an opening that functions as a photographing path using a lens of an image sensor.

The lens barrel 610 may be mounted in the moving frame 620. The moving frame 620 may move the lens barrel 610 mounted therein in the direction of the optical axis. The moving frame 620 may include a magnet on a flat side surface thereof. The moving frame 620 may include grooves on the left and right sides of the magnet in which at least a part of each focusing module ball bearing 613 is received.

According to certain embodiments, the grooves of the moving frame 620 may have a V shape and may extend in the direction of the optical axis. For example, the grooves of the moving frame 620 may make the lens barrel move only in the direction of the optical axis.

The stationary frame 612 may have grooves that correspond to the grooves of the moving frame 620 and in which at least a part of each focusing module ball bearing 613 is received. The grooves of the stationary frame 612 may extend in the direction of the optical axis and may be disposed to face the grooves of the moving frame 620. The stationary frame 612 may include an AF driving coil 611. The AF driving coil 611 may be disposed in a position corresponding to the magnet of the moving frame 620. For example, the AF module may generate a driving force for moving the moving frame 620 in the direction of the optical axis through the AF driving coil 611 and the magnet of the moving frame 620 by changing the direction and amount of a current applied to the AF driving coil 611.

According to certain embodiments, the plurality of focusing module ball bearings 613 may be received in the space between the grooves of the stationary frame 612 and the grooves of the moving frame 620. For example, at least one part of each focusing module ball bearing 613 may be received in the groove of the stationary frame 612, and at least one other part may be received in the groove of the moving frame 620. The plurality of focusing module ball bearings 613 may facilitate the movement of the moving frame 620 while rotating.

The lens barrel 610, the moving frame 620, and the stationary frame 612, which are assembled, may be mounted in the focusing module housing 630. The cover may be coupled to the upper portion of the focusing module housing 630. The cover may include an opening through which a part of the lens barrel 610 is exposed. According to certain embodiments, in order to provide an OIS function, the focusing module housing 630 may include openings in which one or more magnets used for rotating the focusing module are mounted. For example, a first magnet 636 may be disposed on the front side surface of the focusing module housing 630, and a second magnet 637 may be disposed on one lateral side surface of the focusing module housing 630. According to certain embodiments, the focusing module housing 630 may include an opening 635 to which a driving member 670 may be coupled. For example, a part of the driving member 670 may be inserted into the opening 635 that is formed in one lateral side surface of the focusing module housing 630. The circuit board 640 may be disposed on the focusing module housing 630. For example, the focusing module housing 630 may be mounted on the circuit board 640. For example, the circuit board 640 may be electrically connected with the AF driving coil of the stationary frame 612. According to certain embodiments, a flexible circuit board connected with the circuit board 640 may extend to the outside through the focusing module housing 630.

According to various embodiments of the present disclosure, a plurality of focusing modules included in the camera module may be assembled by individual processes. For example, according to various embodiments of the present disclosure, each of the focusing modules may provide an AF function while moving the lens barrel in the direction of the optical axis. Furthermore, according to various embodiments of the present disclosure, an OIS function may be provided independently of the AF function by tilting the plurality of focusing modules.

Figure 7:
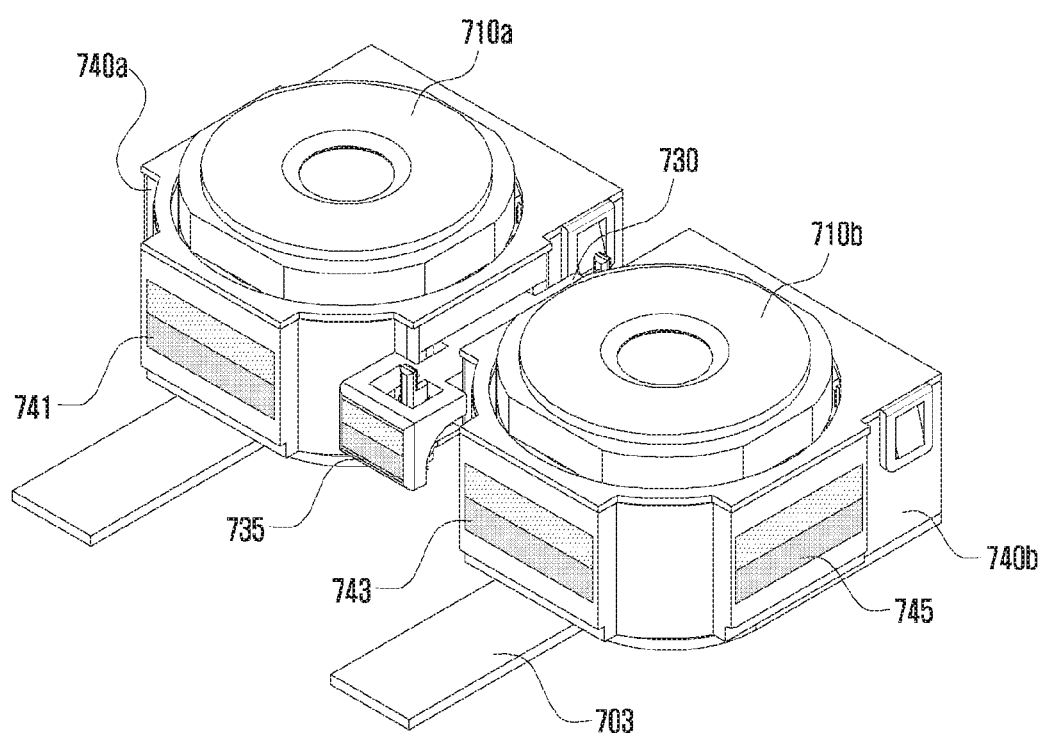
FIG. 7 illustrates a state in which focusing modules and a driving member of a camera module are coupled according to various embodiments of the present disclosure.

FIG. 7 is a perspective view illustrating a state in which focusing modules and a driving member of a camera module are coupled according to various embodiments of the present disclosure.

According to certain embodiments, the camera module may include a plurality of lens barrels 710a and 710b and the plurality of focusing modules 740a and 740b in which the plurality of lens barrels are mounted, respectively. The plurality of focusing modules 740a and 740b may be connected with each other by the driving member 730. For example, the first focusing module 740a may be coupled, at one side thereof, to the driving member 730, and the second focusing module 740b may be coupled, at one side thereof, to the driving member 730. For example, the first and second focusing modules 740a and 740b may include openings formed in lateral side surfaces thereof facing each other, and the driving member 730 may be inserted into the openings. The first and second focusing modules 740a and 740b may be located in mutually symmetric positions with respect to the driving member 730.

According to certain embodiments, the first focusing module 740a may include a first magnet 741 on the front side surface thereof and a second magnet (not illustrated) on the side surface thereof that is opposite to its side surface to which the driving member 730 is connected. The second focusing module 740b may include a third magnet 743 on the front side surface thereof and a fourth magnet 745 on the side surface thereof that is opposite to its side surface to which the driving member 730 is connected.

According to certain embodiments, the driving member 730 may include a protrusion that protrudes from one side thereof and has a flat surface parallel to the first and fourth magnets 741 and 745. According to certain embodiments, the protrusion may include a magnet 735 for measuring the tilt angle of the driving member 730. For example, the magnet 735 may be disposed on the flat surface of the protrusion of the driving member 730.

According to certain embodiments, flexible circuit boards 703 may extend from circuit boards included in the plurality of focusing modules 740a and 740b to the outside through the plurality of focusing modules 740a and 740b.

Figure 8:
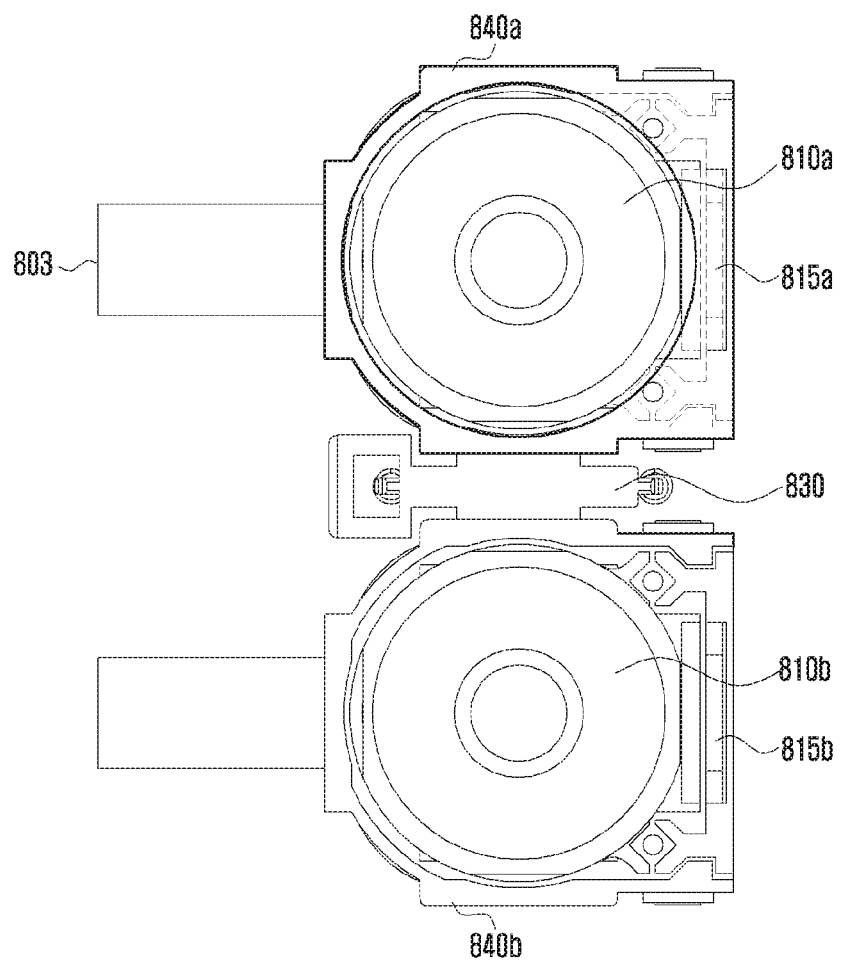
FIG. 8 illustrates a state in which focusing modules and a driving member of a camera module are coupled according to various embodiments of the present disclosure.

FIG. 8 is a top view illustrating a state in which focusing modules and a driving member of a camera module are coupled according to various embodiments of the present disclosure. Hereinafter, features that are the same as the focusing modules and the driving member illustrated in FIG. 7 will be described in brief.

According to certain embodiments, the camera module may have a structure in which the plurality of focusing modules 840a and 840b are connected by the driving member 830. For example, the driving member 830 is coupled to side surfaces of the plurality of focusing modules 840a and 840b so that the driving member 830 and the plurality of focusing modules 840a and 840b may integrally operate (e.g., rotate). According to certain embodiments, the plurality of focusing modules 840a and 840b and the driving member 830, which are coupled to each other, may integrally tilt forward or rearward, or may tilt leftward or rightward. For example, the camera module may provide an OIS function by tilting the plurality of focusing modules 840a and 840b and the driving member 830, which are coupled to each other, in response to a shaking movement of a user's hand. Furthermore, according to certain embodiments, the camera module may provide an AF function independently of the OIS function by moving lens barrels 810a and 810b mounted in the plurality of focusing modules 840a and 840b in the direction of the optical axis. For example, the plurality of focusing modules 840a and 840b may include voice coil motors 815a and 815b, respectively. For example, the plurality of focusing modules 840a and 840b may move the lens barrels 810a and 810b mounted therein in the direction of the optical axis by using the voice coil motors (e.g., by controlling the currents applied to the coils).

According to certain embodiments, flexible circuit boards 803 may extend from circuit boards included in the plurality of focusing modules 840a and 840b to the outside through the plurality of focusing modules 840a and 840b.

Figure 9:
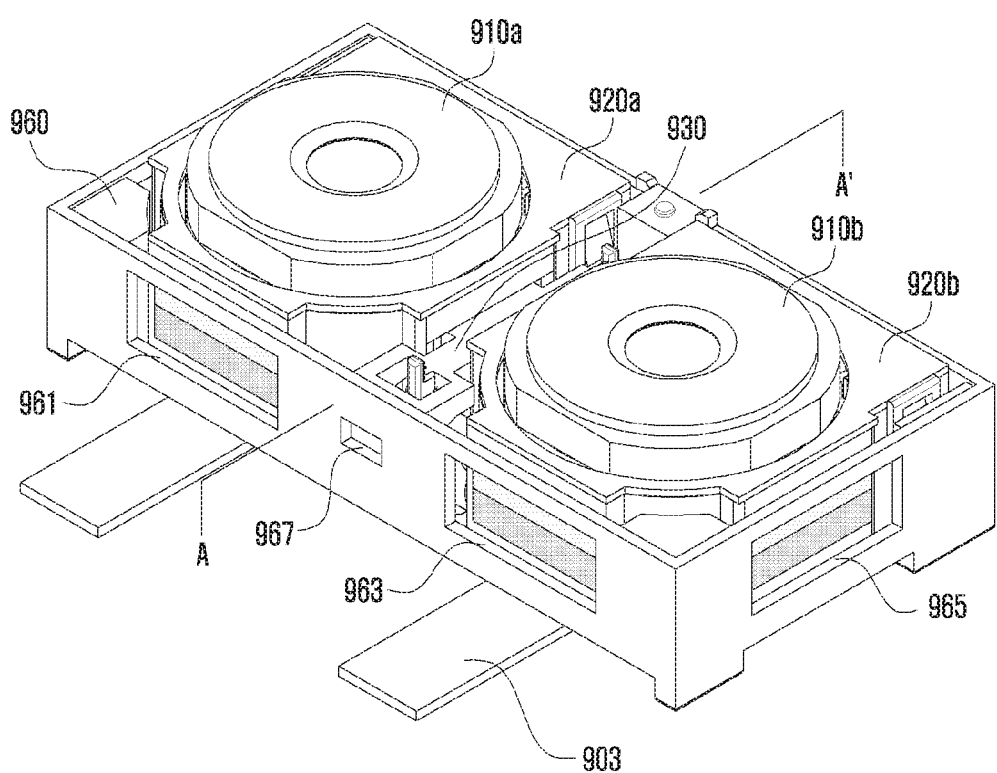
FIG. 9 illustrates a state in which focusing modules, a driving member, and a fixing member of a camera module are coupled according to various embodiments of the present disclosure.

FIG. 9 is a view illustrating a state in which focusing modules, a driving member, and a fixing member of a camera module are coupled according to various embodiments of the present disclosure. For example, FIG. 9 illustrates a state in which an assembly of focusing modules and a driving member, which is similar to that illustrated in FIG. 7, is mounted in a fixing member.

According to certain embodiments, lens barrels 910a and 910b may be mounted in the plurality of focusing modules 920a and 920b, respectively. The plurality of focusing modules 920a and 920b may be connected with each other by the driving member 930. For example, each of the focusing modules 920a and 920b may be coupled, at one side thereof, to the driving member 930 so that the focusing modules 920a and 920b may form a symmetric structure with respect to the driving member 730.

The plurality of focusing modules 920a and 920b and the driving member 930, which are connected to each other, may be mounted in the fixing member 960. According to certain embodiments, the fixing member 960 may include a plurality of openings 961, 963, 965, and 967 in the positions that correspond to one or more magnets included in the first focusing module 920a, one or more magnets included in the second focusing module 920b, and a magnet included in the driving member 930. For example, the fixing member may include: the first opening 961 that corresponds to the first magnet disposed on the front of the first focusing module 920a; the second opening (not illustrated) that corresponds to the second magnet disposed on the side surface of the first focusing module 920a that is opposite to the driving member 930; the third opening 963 that corresponds to the third magnet disposed on the front of the second focusing module 920b; and the fourth opening 965 that corresponds to the fourth magnet disposed on the side surface of the second focusing module 920b that is opposite to the driving member 930. According to certain embodiments, in a case where the driving member 930 includes a magnet, the fixing member 960 may include the fifth opening 967 that corresponds to the magnet of the driving member 930.

According to certain embodiments, flexible circuit boards 903 electrically connected to the circuit boards of the plurality of focusing modules 920a and 920b may extend to the outside through the fixing member.

Figure 10:
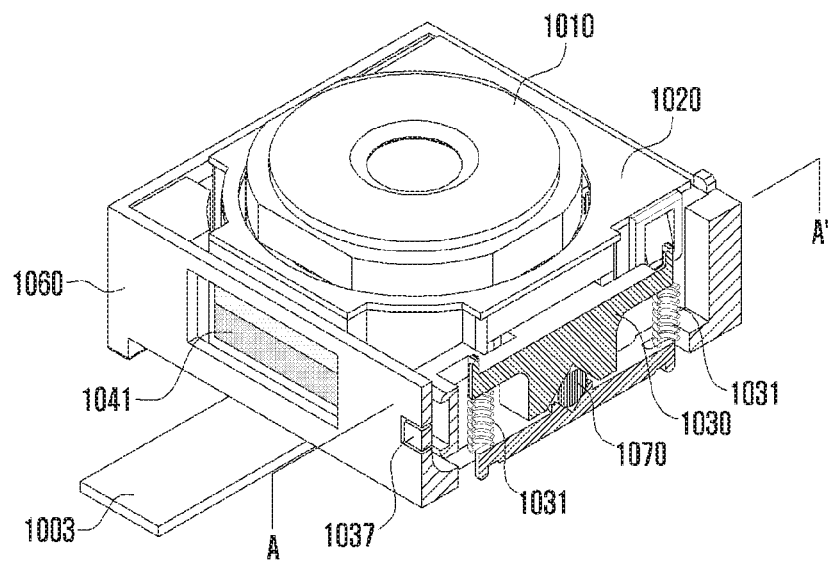
FIG. 10 illustrates the structure of a camera module according to various embodiments of the present disclosure.

FIG. 10 is a view for explaining the structure of a camera module according to various embodiments of the present disclosure. For example, FIG. 10 illustrates a section taken along line A-A' in the structure of the camera module illustrated in FIG. 9. Hereinafter, the features of elements that are the same as those illustrated in FIG. 9 will be described in brief.

According to certain embodiments, a lens barrel 1010 may be mounted in a focusing module 1020. A driving member 1030 may be connected to one side surface of the focusing module 1020. A first magnet 1041 may be disposed on the front side surface of the focusing module 1020. A second magnet (not illustrated) may be disposed on the side surface of the focusing module 1020 that is opposite to the driving member 1030.

The driving member 1030 may be coupled to an opening formed in the side surface of the focusing module 1020. The driving member 1030 may include springs 1031 that are connected to the internal bottom surface of a fixing member 1060 to prevent the driving member 1030 from being separated from the fixing member 1060. The springs 1031 may be connected to hook-shaped protrusions that are formed on opposite ends of the driving member 1030. The driving member 1030 may include a recess formed in the external bottom surface thereof for receiving a part of a ball bearing 1070.

The fixing member 1060 may include a recess in which a part of the ball bearing 1070 may be seated. The plurality of focusing modules 1020a and 1020b and the driving member 1030, which are connected to each other, may be mounted in the fixing member 1060.

The ball bearing 1070 may be received in the recess of the driving member 1030 and in the recess of the fixing member 1060. The driving member 1030 and the focusing module 1020 may effectively rotate about the ball bearing 1070 in a first direction or in a second direction by rotation of the ball bearing 1070.

A flexible circuit board 1003 may be electrically connected to the circuit board included in the focusing module 1020. For example, the flexible circuit board 1003 may extend from the circuit board included in the focusing module 1020 to the outside through the focusing module 1020.

Figure 11:
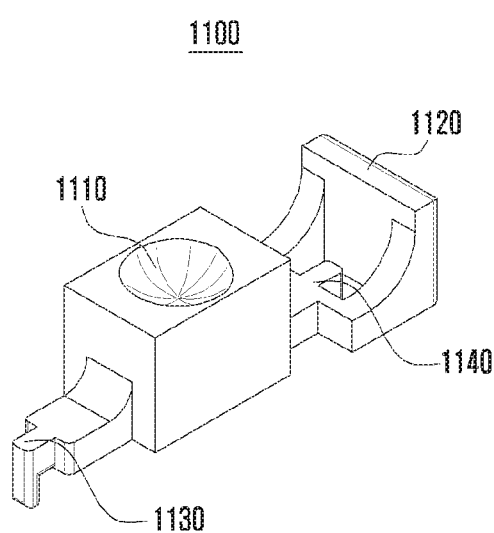
FIG. 11 illustrates a driving member of a camera module according to various embodiments of the present disclosure.

FIG. 11 is a view illustrating a driving member of a camera module according to various embodiments of the present disclosure. FIG. 11 illustrates the rear of the driving member 1100 according to the various embodiments of the present disclosure.

According to certain embodiments, the driving member 1100 may include a recess 1110 formed in the rear surface thereof in which at least a part of a ball bearing may be received. For example, the recess 1110 may have a conical shape. According to certain embodiments, the driving member 1100 may have hook-shaped protrusions 1130 and 1140 on the front and rear sides thereof. Springs may be connected to the hook-shaped portions 1130 and 1140 of the driving member 1100 in order to prevent the driving member 1100 from being separated from a fixing member (not illustrated). For example, the driving member 1100 may be secured to the fixing member through the springs. According to certain embodiments, the driving member 1100 may include a protrusion 1120 that protrudes from one side surface thereof in one direction (forward) and has a flat surface with a specified area. A magnet used for detecting the tilted state of the driving member 1100 may be disposed on the flat surface of the protrusion 1120. For example, a magnet for detecting the initial state of the driving member 1100 may be mounted on the flat surface of the protrusion 1120.

Figure 12:
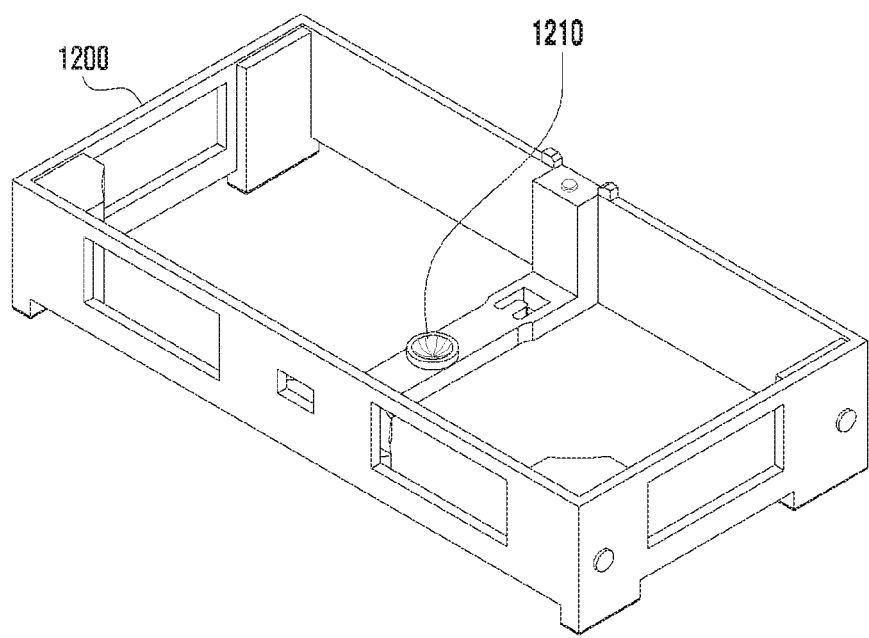
FIG. 12 illustrates a fixing member of a camera module according to various embodiments of the present disclosure.

FIG. 12 is a view illustrating a fixing member of a camera module according to various embodiments of the present disclosure.

According to certain embodiments, a plurality of focusing modules and a driving member may be mounted in the fixing member 1200. According to certain embodiments, the fixing member 1200 may include a plurality of openings in the positions corresponding to a plurality of magnets included in the plurality of mounted focusing modules such that the plurality of magnets and driving coils corresponding to the plurality of magnets may face the plurality of openings. The fixing member 1200 may include an opening for sensing that is formed in the central portion of the front thereof to correspond to a sensor connected to a circuit board.

According to certain embodiments, the fixing member 1200 may include openings that correspond to the plurality of focusing modules mounted on the rear surface (bottom surface) thereof. For example, the fixing member 1200 may include the openings in the positions corresponding to the plurality of focusing modules in order to enable the plurality of mounted focusing modules to rotate.

According to certain embodiments, the fixing member 1200 may have a bottom surface corresponding to the space between the plurality of focusing modules in a case where the plurality of focusing modules are mounted in the fixing member 1200. For example, the fixing member 1200 may have a bottom surface located below the driving member that connects the plurality of focusing modules. According to certain embodiments, the driving member 1200 may include a recess 1210 formed in the center of the lower surface thereof in which at least a part of a ball bearing may be seated. According to certain embodiments, the recess 1210 may be formed in a conical shape. The ball bearing may be received in the recess 1210 and in a recess formed in the rear surface of the driving member. The ball bearing may rotate according to a driving force generated in the camera module to enable a user's driving member to effectively rotate.

Figure 13:
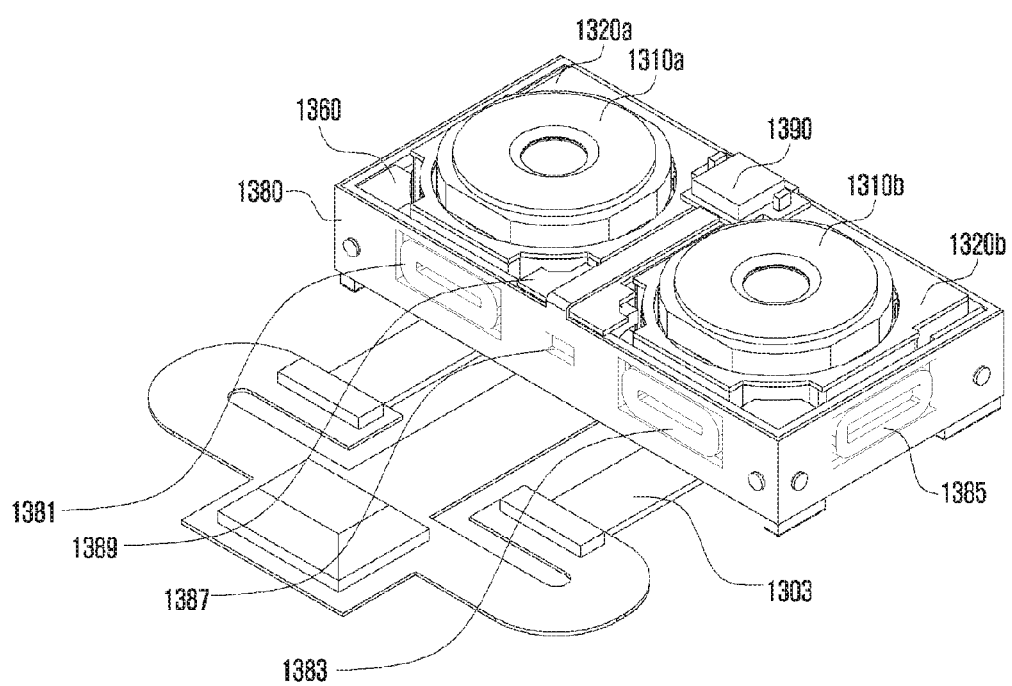
FIG. 13 illustrates a camera module according to various embodiments of the present disclosure.

FIG. 13 is a view illustrating a camera module according to various embodiments of the present disclosure.

According to certain embodiments, the camera module may include: a plurality of focusing modules 1320a and 1320b; a plurality of lens barrels 1310a and 1310b mounted in the plurality of focusing modules 1320a and 1320b, respectively, wherein at least a part of each lens barrel is exposed to the outside; a plurality of driving coils 1381, 1383, and 1385; a plurality of magnets that correspond to the plurality of driving coils 1381, 1383, and 1385; a circuit board 1380 electrically connected with the plurality of driving coils 1381, 1383, and 1385; flexible circuit boards 1303; a driving member (not illustrated); a ball bearing (not illustrated); a sensor 1387 for measuring the tilted state of the driving member; and a sensor 1390 that detects the movement of the plurality of focusing modules 1320a and 1320b and the driving member that are coupled to each other.

FIG. 13 illustrates a state in which the circuit board 1380 formed to surround the fixing member is assembled while the plurality of focusing modules 1320a and 1320b and the driving member, which are coupled to each other, are mounted in the fixing member as illustrated in FIG. 9. According to certain embodiments, the circuit board 1380 may include the plurality of driving coils 1381, 1383, and 1385 disposed in the positions that correspond to one or more magnets included in the plurality of focusing modules 1320a and 1320b.

Figure 14A:
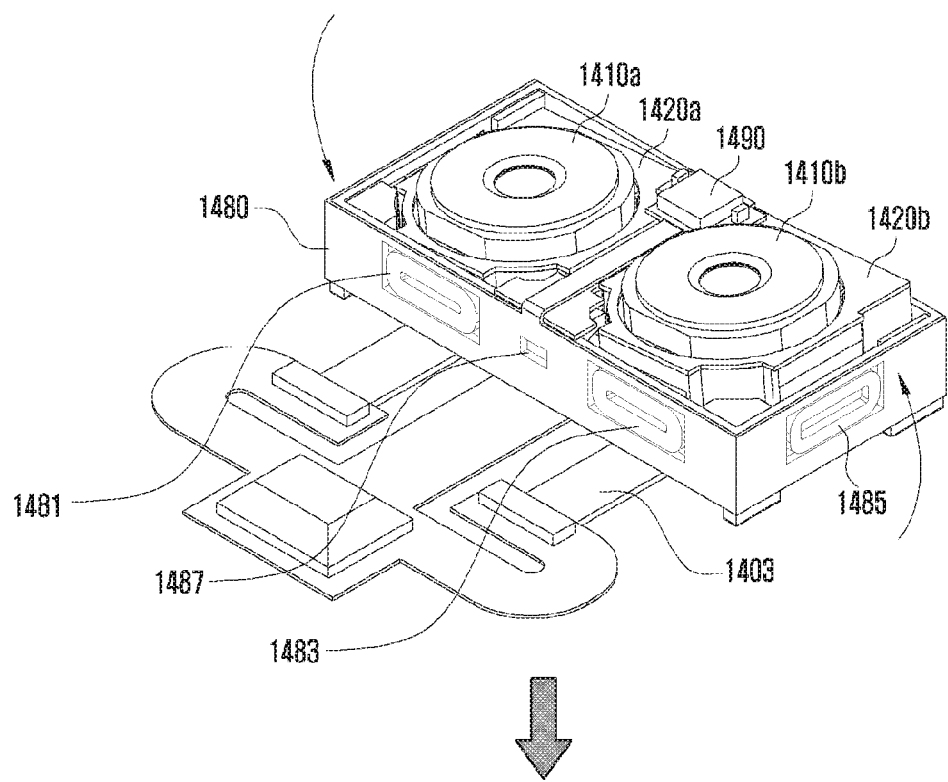
FIGS. 14A and 14B illustrate the operation of a camera module according to various embodiments of the present disclosure.
Figure 14A:
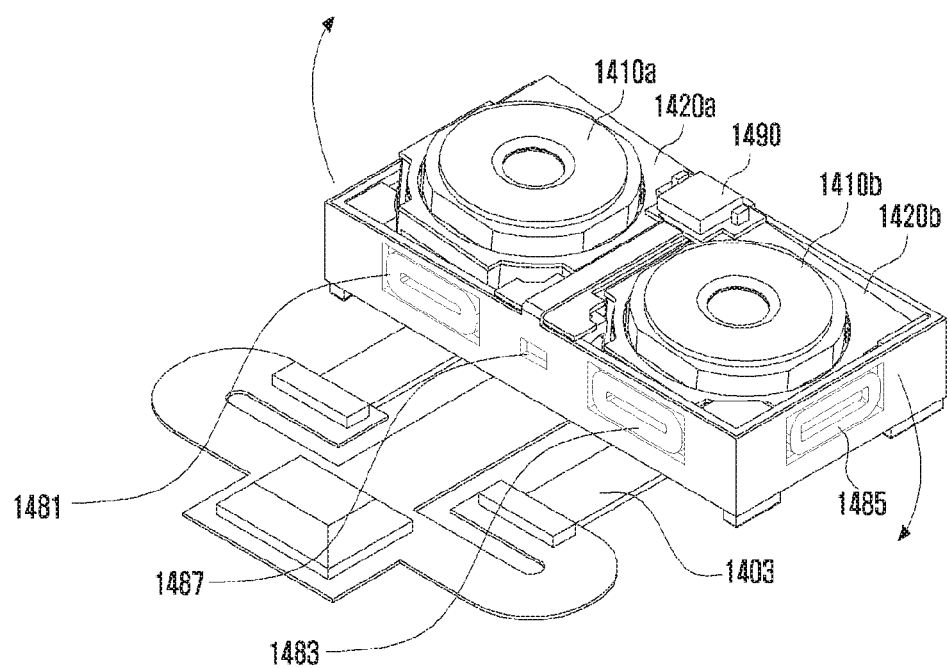
Figure 14B:
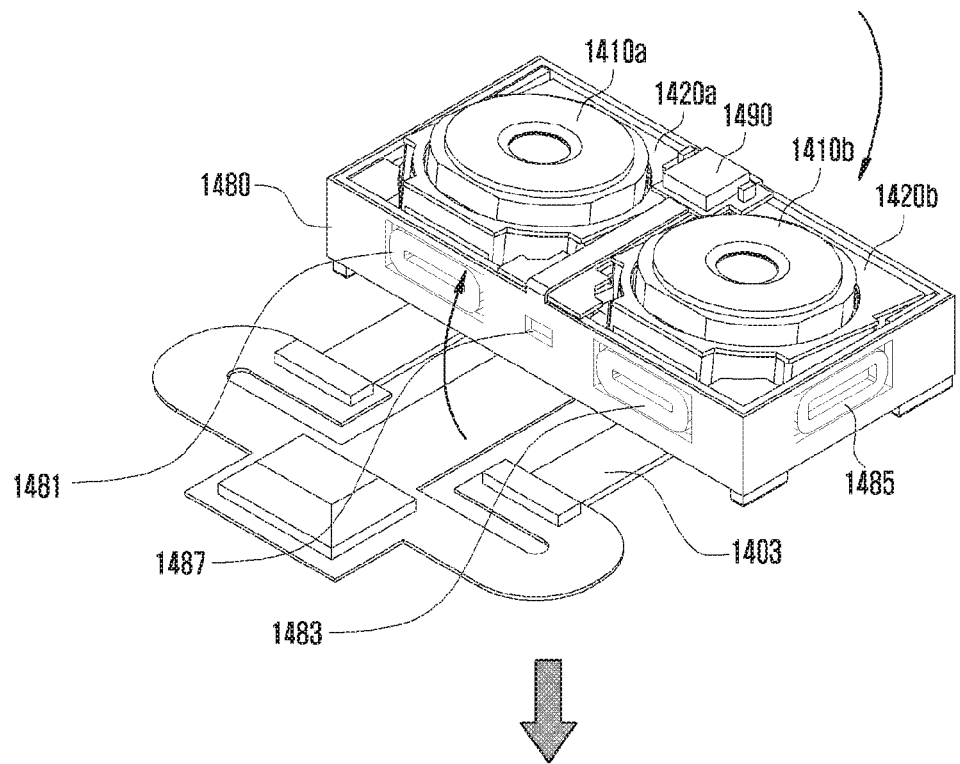
Figure 14B:
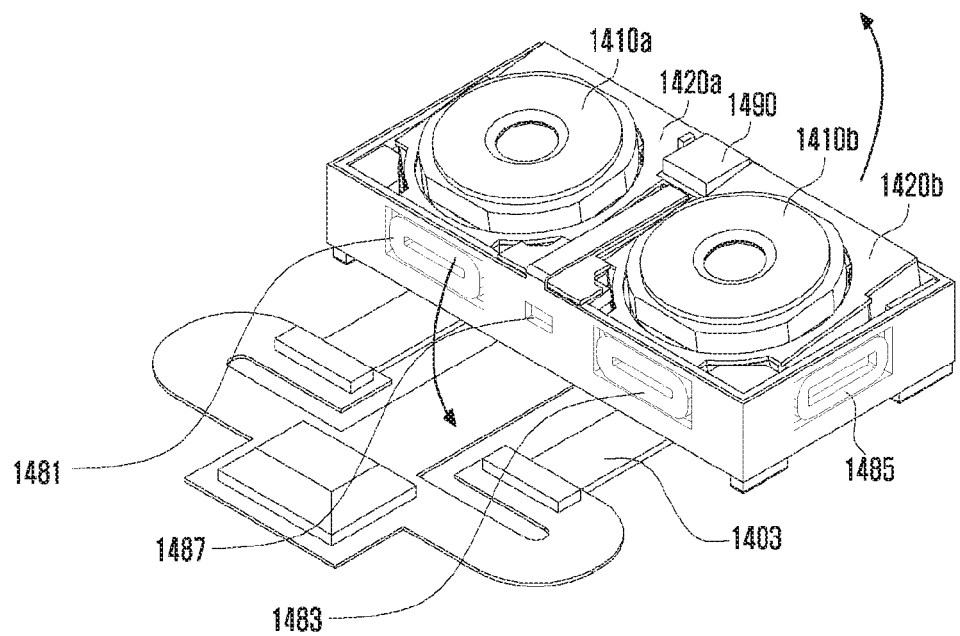

FIGS. 14A and 14B are views for explaining the operation of a camera module according to various embodiments of the present disclosure. For example, FIGS. 14A and 14B illustrate an operation in which the camera module similar to that illustrated in FIG. 13 rotates in at least one direction in order to provide an OIS function.

According to certain embodiments, the camera module may include: a plurality of focusing modules 1420a and 1420b; a plurality of lens barrels 1410a and 1410b mounted in the plurality of focusing modules 1420a and 1420b, respectively, wherein at least a part of each lens barrel is exposed to the outside; a plurality of driving coils 1481, 1483, and 1485; a plurality of magnets that correspond to the plurality of driving coils 1481, 1483, and 1485; a circuit board 1480 electrically connected with the plurality of driving coils 1481, 1483, and 1485; flexible circuit boards 1403; a driving member (not illustrated); a ball bearing (not illustrated); a sensor 1487 for measuring the tilted state of the driving member; and a sensor 1490 that detects the movement of the plurality of focusing modules 1420a and 1420b and the driving member that are coupled to each other.

According to certain embodiments, the plurality of focusing modules 1420a and 1420b and the driving member (not illustrated) connected with the plurality of focusing modules 1420a and 1420b, which are included in the camera module, may integrally rotate in at least one direction using driving forces generated by the driving coils 1481, 1483, and 1485 and the magnets (not illustrated) included in the plurality of focusing modules 1420a and 1420b.

According to certain embodiments, the first focusing module 1420a may include the first magnet on the front side surface thereof and the second magnet on one lateral side surface thereof that is opposite to the second focusing module 1420b. The second focusing module 1420b may include the third magnet on the front side surface thereof and the fourth magnet on one lateral side surface thereof that is opposite to the first focusing module.

According to certain embodiments, the circuit board 1480 may be formed to surround the plurality of focusing modules 1420a and 1420b. For example, the circuit board 1480 may be formed to surround one lateral side surface and the front side surface of the first focusing module and the front side surface and one lateral side surface of the second focusing module. The circuit board 1480 may include the first driving coil 1481 in the position corresponding to the first magnet, the second driving coil (not illustrated) in the position corresponding to the second magnet, the third driving coil 1483 in the position corresponding to the third magnet, and the fourth driving coil 1485 in the position corresponding to the fourth magnet.

Referring to FIG. 14A, magnetic forces may be imparted to the second and fourth magnets in different directions by applying currents to the second and fourth driving coils in different directions. For example, driving forces for rotating the plurality of focusing modules 1420a, 1420b and the driving member, which are coupled to each other, may be generated by applying currents to the second and fourth driving coils in different directions. For example, the driving forces may be generated in the second and fourth driving coils in different directions. For example, the plurality of focusing modules 1420a and 1420b and the driving member, which are coupled to each other, may rotate to one side (in the yaw direction) about the ball bearing (not illustrated), which is disposed on the lower end of the driving member, by means of the generated driving forces.

Referring to FIG. 14B, magnetic forces may be imparted to the first and third magnets in different directions by applying currents to the first and third driving coils in different directions. For example, driving forces for rotating the plurality of focusing modules 1420a, 1420b and the driving member, which are coupled to each other, in one direction may be generated by applying currents to the first and third driving coils in different directions. For example, the driving forces may be generated in the first and third driving coils in different directions. For example, the plurality of focusing modules 1420a and 1420b and the driving member, which are coupled to each other, may rotate to the front or rear side (in the pitch direction) about the ball bearing (not illustrated), which is disposed on the lower end of the driving member, by means of the generated driving forces.

The first sensor 1487 may be electrically connected to the circuit board 1480. For example, the first sensor 1487 may be a first Hall sensor. The first sensor 1487 may detect the tilted state of the plurality of focusing modules 1420*a* and 1420*b* and the driving member, which are coupled to each other, by measuring the state of the first or third magnet. For example, since the position of the first or third magnet relative to the first sensor 1487 is changed by the rotation of the plurality of focusing modules 1420*a* and 1420*b* and the driving member, which are coupled to each other, the first sensor may detect the tilted state (e.g., the tilt angle, etc.) of the plurality of focusing modules 1420*a* and 1420*b* and the driving member, which are coupled to each other, by measuring the state of the first or third magnet (e.g., the magnetic field generated by the first or third magnet, etc.). According to certain embodiments, the camera module may identify the initially tilted state of the plurality of focusing modules 1420*a* and 1420*b* and the driving member, which are coupled to each other, through the first sensor 1487 before operating. Accordingly, in a case where the plurality of focusing modules 1420*a* and 1420*b* and the driving member, which are coupled to each other, are tilted before the camera module operates (e.g., before the camera module photographs an image or video), the camera module may control the plurality of focusing modules 1420*a* and 1420*b* and the driving member, which are coupled to each other, to be horizontally oriented.

According to certain embodiments, the second sensor 1490 may be mounted on the upper surface of the driving member. According to certain embodiments, the second sensor 1490 may integrally rotate with the driving member according to the rotation of the driving member and the plurality of focusing modules 1420*a* and 1420*b* coupled with the driving member. The second sensor 1490 may detect a movement of the plurality of focusing modules 1420*a* and 1420*b* and the driving member, which are coupled to each other (e.g., rotation of the plurality of focusing modules 1420*a* and 1420*b* and the driving member which are coupled to each other). For example, the second sensor 1490 may be an angular velocity sensor or a gyro sensor.

According to certain embodiments, the camera module may control the OIS function thereof based on a signal output from the second sensor 1490. For example, the camera module may change the amounts or directions of currents applied to the first to fourth driving coils 1481, 1483, and 1485 according to the signal output from the second sensor 1490. For example, the signal output from the second sensor 1490 may be directly used to control the operation of the camera module since the second sensor 1490 is mounted in the camera module. For example, the camera module may change the amounts or directions of the currents applied to the first to fourth driving coils 1481, 1483, and 1485 such that the signal output from the second sensor 1490 has a preset value. For example, the camera module may change the amounts or directions of the currents applied to the first to fourth driving coils such that the signal output from the second sensor 1490 approaches 0. Namely, by adjusting the amounts or directions of the currents applied to the first to fourth driving coils 1481, 1483, and 1485 such that the second sensor 1490, which moves together with the camera module, outputs a signal informing that there is no movement of the camera module, the camera module (the plurality of focusing modules 1420*a* and 1420*b* and the driving member which are coupled to each other) may be tilted in a direction that is opposite to a movement of the camera module that is substantially caused by a shaking movement of a user's hand. For example, in a case where the second sensor 1490 detects a signal having a particular waveform, the camera module may set a value corresponding to an opposite waveform as a target value for rotating the camera module. That is, the camera module may adjust the amounts or directions of the currents applied to the first to fourth driving coils 1481, 1483, and 1485 such that the signal detected by the second sensor 1490 approaches 0. Accordingly, the plurality of focusing modules 1420*a* and 1420*b* and the driving member, which are coupled to each other, may rotate in a particular direction in response to the change in the amounts or directions of the currents applied to the first to fourth driving coils 1481, 1483, and 1485. For example, in a case where a value obtained by integrating an angular velocity signal output from the second sensor 1490 is used to control the operation of the camera module, the constant of integration may cause an error. According to certain embodiments of the present disclosure, by using the signal output from the second sensor 1490 as it is for the camera module, it is possible to prevent the error caused by the constant of integration and to more accurately control the operation of the camera module.

Figure 15:
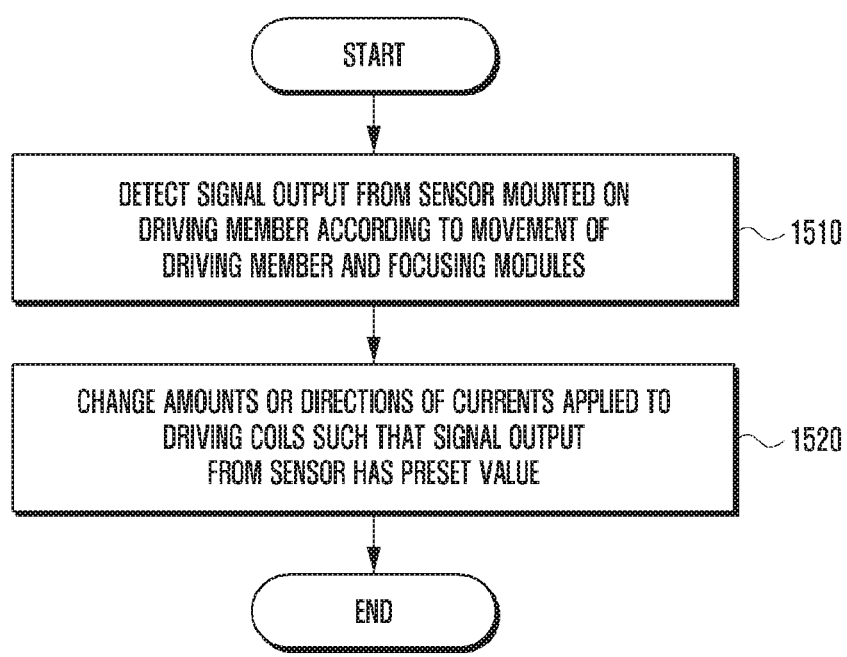
FIG. 15 illustrates a method for controlling the operation of a camera module according to various embodiments of the present disclosure.

FIG. 15 is a flowchart illustrating a method for controlling the operation of a camera module according to various embodiments of the present disclosure.

An electronic device, according to various embodiments of the present disclosure, may include a camera module. According to certain embodiments, the electronic device may control the operation of the camera module.

According to certain embodiments of the present disclosure, the camera module may include: a plurality of focusing modules having a plurality of lens barrels mounted therein, respectively, wherein each focusing module includes one or more magnets on side surfaces thereof; a driving member coupled with the plurality of focusing modules and having a recess that is formed to receive a part of a ball bearing; a fixing member in which the driving member coupled with the plurality of focusing modules is mounted, the fixing member having a recess formed in the center of the internal bottom surface thereof in which a part of the ball bearing is seated; a flexible circuit board that is formed to surround side surfaces of the fixing member and includes one or more driving coils that correspond to the one or more magnets; and a sensor mounted on the upper surface of the driving member.

According to certain embodiments, in operation 1510, the camera module may detect a signal output from the sensor disposed on the driving member according to the movement of the driving member and the plurality of focusing modules. For example, a sensor for detecting the movement of the plurality of focusing modules or the driving member may be disposed on the driving member. According to certain embodiments, the sensor may be an angular velocity sensor or a gyro sensor. According to certain embodiments, the sensor may integrally rotate together with the driving member and the focusing modules.

In operation 1520, the camera module may change the amounts or directions of currents applied to the one or more driving coils such that the signal output from the sensor has a preset value. For example, the camera module may adjust the directions of the currents applied to the driving coils such that the signal output from the sensor has a value of 0. For example, the camera module may adjust the intensities and directions of driving forces generated in the driving coils by controlling the currents applied to the driving coils such that the second sensor 1490 outputs a signal informing that there is no movement of the camera module (i.e., a signal having a value of 0). Accordingly, the camera module may provide an OIS function by integrally rotating the plurality of focusing modules and the driving member, which are coupled to each other, according to the driving forces generated in the driving coils.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory) in the form of a program module. The instruction, when executed by a processor (e.g., the processor), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code which is made by a compiler or a code which may be executed by an interpreter. The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A camera module including a plurality of lenses, comprising:
   a plurality of lens barrels comprising the plurality of lenses, respectively;
   a plurality of focusing modules in which the plurality of lens barrels are mounted, respectively, each focusing module comprising one or more magnets on side surfaces thereof;
   a driving member coupled with the plurality of focusing modules and comprising a recess formed to receive a part of a ball bearing;
   a fixing member in which the driving member coupled with the plurality of focusing modules is mounted, the fixing member comprising a recess formed in a center of an internal bottom surface thereof and a part of the ball bearing is seated in the recess;
   the ball bearing received in the recess of the driving member and in the recess of the fixing member; and
   a circuit board formed to surround side surfaces of the fixing member and comprising one or more driving coils corresponding to the one or more magnets,
   wherein the driving member is configured to integrally drive the plurality of focusing modules in response to driving forces generated through the one or more driving coils.

2. The camera module of claim 1, further comprising:
   a sensor mounted on an upper surface of the driving member and configured to detect a movement of the driving member.

3. The camera module of claim 2, wherein the sensor is an angular velocity sensor or a gyro sensor.

4. The camera module of claim 1, wherein the driving member comprises a protrusion configured to protrude from one side surface thereof in one direction and comprising a magnet for measuring a tilt angle of the driving member.

5. The camera module of claim 4, wherein the circuit board further comprises a sensor configured to detect a tilted state of the driving member and the plurality of focusing modules by measuring states of the one or more magnets included in the plurality of focusing modules or a state of the magnet included in the driving member.

6. The camera module of claim 1, wherein the driving member and the plurality of focusing modules coupled with the driving member are configured to rotate about the ball bearing in a first or second direction using driving forces that are generated by the one or more magnets included in the plurality of focusing modules and the one or more driving coils included in the circuit board.

7. The camera module of claim 1, wherein each of the focusing modules comprises an opening in one side surface thereof to which the driving member is coupled.

8. The camera module of claim 1, wherein the driving member further comprises one or more springs connected to the internal bottom surface of the fixing member to prevent the driving member from being separated from the fixing member.

9. The camera module of claim 1, wherein the fixing member comprises one or more openings that are formed to correspond to positions of the one or more magnets such that the one or more magnets are exposed through the openings to the outside.

10. The camera module of claim 1, wherein each focusing module comprises:
    a moving frame configured to move a lens barrel of the plurality of lens barrels included in the focusing module in a direction of an optical axis; and
    a stationary frame configured to movably support the moving frame.

11. The camera module of claim 2, wherein driving forces for rotating the focusing modules and the driving member are generated from the one or more driving coils and the one or more magnets by controlling currents flowing in the one or more driving coils based on a signal detected by the sensor included in the driving member.

12. The camera module of claim 1, wherein each of the plurality of focusing modules comprises:
    a first magnet for rotating the focusing module and the driving member in a first direction; and
    a second magnet for rotating the focusing module and the driving member in a second direction, and the circuit board comprises:
- a plurality of first driving coils corresponding to the first magnets of the plurality of focusing modules, respectively; and
- a plurality of second driving coils corresponding to the second magnets of the plurality of focusing modules, respectively.

13. The camera module of claim 1, wherein the plurality of lens barrels comprise a first lens barrel and a second lens barrel;
the plurality of focusing modules comprise a first focusing module in which the first lens barrel is mounted and a second focusing module in which the second lens barrel is mounted; and
the driving member is configured to connect one side surface of the first focusing module and one side surface of the second focusing module.

14. The camera module of claim 13, wherein each of the first and second focusing modules comprises:
- a first magnet on one side surface thereof that extends from its side surface to which the driving member is connected; and
- a second magnet on the side surface thereof that is opposite to its side surface to which the driving member is connected.

15. The camera module of claim 13, wherein the first and second focusing modules are symmetric to each other with respect to the driving member.

16. The camera module of claim 13, wherein the circuit board comprises:
- a first driving coil located to correspond to a first magnet of each of the first and second focusing modules and configured to generate a driving force for integrally rotating the first focusing module, the second focusing module, and the driving member in a first direction; and
- a second driving coil located to correspond to a second magnet of each of the first and second focusing modules and configured to generate a driving force for integrally rotating the first focusing module, the second focusing module, and the driving member in a second direction.

17. The camera module of claim 1, wherein the fixing member further comprises:
- a cover configured to cover an upper surface of the driving member mounted in the fixing member to prevent the driving member from being separated from the fixing member.

18. An electronic device comprising:
a housing; and
a camera module, at least a part of which is mounted on one side of the housing,
wherein the camera module comprises:
- a plurality of lens barrels comprising a plurality of lenses, respectively;
- a plurality of focusing modules in which the plurality of lens barrels are mounted, respectively, each focusing module comprising one or more magnets on side surfaces thereof;
- a driving member coupled with the plurality of focusing modules and comprising a recess that is formed to receive a part of a ball bearing;
- a fixing member in which the driving member coupled with the plurality of focusing modules is mounted, the fixing member comprising a recess formed in a center of an internal bottom surface thereof and a part of the ball bearing is seated in the recess;
- the ball bearing received in the recess of the driving member and in the recess of the fixing member; and
- a circuit board formed to surround side surfaces of the fixing member and comprising one or more driving coils corresponding to the one or more magnets,
wherein the driving member is configured to integrally drive the plurality of focusing modules in response to driving forces generated through the one or more driving coils.

19. The electronic device of claim 18, wherein the driving member and the plurality of focusing modules coupled with the driving member are configured to rotate about the ball bearing in a first or second direction using driving forces that are generated by the one or more magnets included in the plurality of focusing modules and the one or more driving coils included in the circuit board.

20. A method of controlling an operation of a camera module, the method comprising:
detecting a signal output from a sensor according to movement of a driving member and a plurality of focusing modules, each focusing module of the plurality of focusing modules include one or more magnets and the driving member includes a recess to include part of a ball bearing;
changing amounts or directions of currents applied to one or more driving coils in a manner that the signal output from the sensor has a preset value, wherein the one or more driving coils correspond to the one or more magnets included in each of the plurality of focusing modules; and
rotating the driving member and the plurality of focusing modules, based on the changed amounts or directions of the currents applied to the one or more driving coils, wherein the driving member rotates about the ball bearing and integrally drive the plurality of focusing modules.

* * * * *